United States Patent [19]
Manuel

[11] Patent Number: 4,700,412
[45] Date of Patent: Oct. 20, 1987

[54] UNIVERSAL TRAP
[75] Inventor: John L. Manuel, Wichita, Kans.
[73] Assignee: Gary Allred, Winfield, Kans.
[21] Appl. No.: 835,386
[22] Filed: Mar. 3, 1986
[51] Int. Cl.$^4$ .............................................. B01D 21/00
[52] U.S. Cl. ................................. 4/207; 137/247.51; 210/311
[58] Field of Search .................. 4/207, 206, 292, 288, 4/291, 290; 137/247.45, 247.51, 247.35, 247.39, 247.41; D23/46; 210/311; 261/DIG. 65

[56] References Cited

U.S. PATENT DOCUMENTS

| 1,198,759 | 9/1916 | Pinder et al. | 137/247.51 |
| 1,822,440 | 9/1931 | Jacobsen | 210/311 |
| 2,170,390 | 8/1939 | Ritter | 137/247.45 |
| 2,256,758 | 9/1941 | Groeniger | 137/247.45 |
| 2,646,884 | 7/1953 | Findley | 210/311 |
| 2,742,101 | 4/1956 | Stambaugh | 137/247.41 |
| 4,164,048 | 8/1979 | Kampfer et al. | 137/247.41 |
| 4,179,762 | 12/1979 | Barnhardt et al. | 137/247.51 |
| 4,230,582 | 10/1980 | Tuleja | 137/247.51 |
| 4,385,891 | 5/1983 | Ligotti | 210/311 |

FOREIGN PATENT DOCUMENTS 40292  7/1887  Fed. Rep. of Germany .

Primary Examiner—Henry J. Recla
Assistant Examiner—Leo J. Peters
Attorney, Agent, or Firm—Edward L. Brown, Jr.

[57] ABSTRACT

A universal drain trap and separator having a hand removable bowl with an open top and a center post which extends upwardly through a lid member which closes the bowl in a sealed relation; inlet and outlet conduits attached to the lid and fastening means including a handle which passes up through the center post of the bowl for attachment to the lid and a peripheral lip around the top of the bowl extending upwardly sufficiently to contain the fluid in the conduits and trap when the bowl is removed therefrom.

12 Claims, 4 Drawing Figures

UNIVERSAL TRAP

BACKGROUND OF THE INVENTION

The invention relates generally to traps in drain plumbing and more particularly to a readily cleanable trap which functions not only as a gas trap in a drain line, but also a filter as well as an air-water separator and numerous other filtering functions.

Various styles of plumbing traps which block flow of sewer gas back-flowing through a drain line have been available since the inception of indoor plumbing. The commonly coniiguredp-trap or S-trap have been utilized since the last century. A trap which provides a removable cup is typified by U.S. Pat. No. 1,210,201. Other types of cleanable traps are shown in U.S. Pat. Nos. 2,742,101, 3,994,031, 2,170,390 and 919,701.

SUMMARY OF THE INVENTION

In all of the traps of the above-mentioned patents, as well as the standard p-traps sold in the market, there is an inherent disadvantage in that as the trap is broken open, the water contained in the connecting conduits spills on the floor or on the hands of the person cleaning the trap which is a very unsanitary condition. The trap of the present invention comprises a removable bowl with a substantia lip around the periphery thereof that contains all of the water in the adjacent conduits. The bowl is readily removed from the rest of the trap by turning a large hand-twisted knob located on the bottom thereof. The trap has universal application not only as a sewer gas trap but also as a particulate filter, air-water separator, and separator for various metals such as mercury, gold and silver. The trap can be used on a vacuum or pressure system with various types of filtering elements such as mesh screens or chemical impregnated iilters. The trap can accumulate a substantial amount of particulate material without substantial obstruction of flow through the trap.

It is therefore the principal object of the present invention to provide a universal trap design with numerous applications which is inexpensive to build, rugged in construction and easily cleanable.

A further object of the present invention is to provide a drain trap which can be readily opened without tools and without spilling any water in the drain lines.

A further object of the present invention is to provide a drain trap which filters certain sized particulate matter which is readily cleanable by hand without tools.

Another object of the present invention is to provide a trap with a removable bowl having a support base which is also the removal handle.

Still a further object of the present invention is to provide a drain trap which due to its integral simple construction may be easily installed and serviced by direct access with a minimum of labor.

These and other objects will become more apparent to those skilled in the art upon reviewing the summary of this invention in addition to a study of the description of the preferred embodiment described hereafter.

DESCRIPTION OF THE PREFERRED EMBODIMENT

Figure 1:
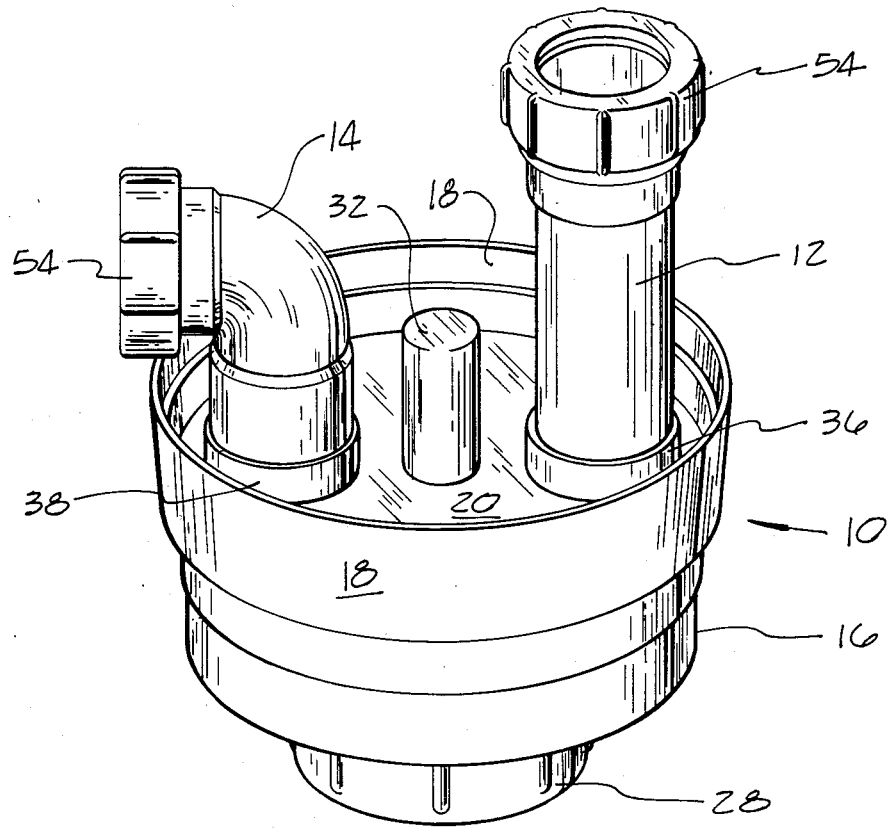
FIG. 1 is a perspective view of the assembled trap of the present invention.
Figure 2:
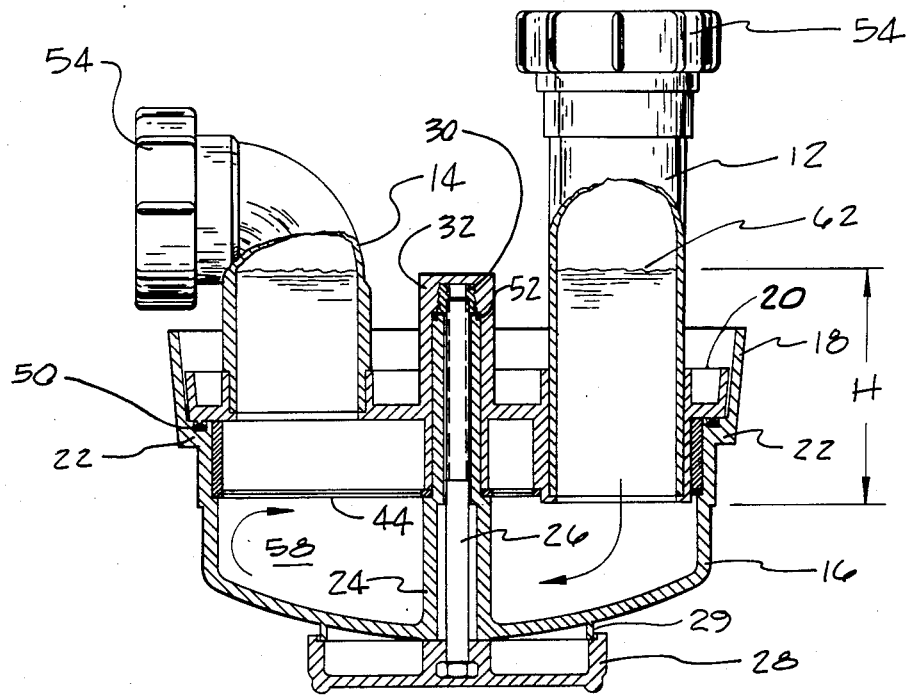
FIG. 2 is a side elevational section of the assembled trap.
Figure 3:
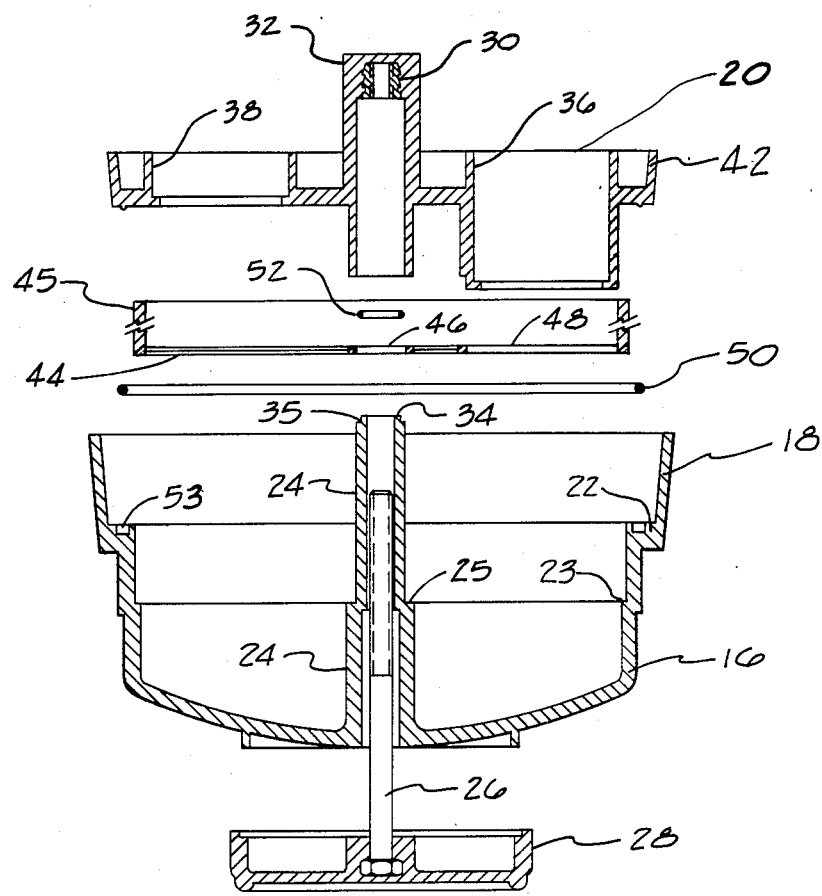
FIG. 3 is an exploded sectional view of the various components within the trap.

Referring to the drawings and in particular to FIG. 1, the universal drain trap is generally described by reference numeral 10 and includes a circular bowl 16 having an open top which is closed by a removable lid member 20. Passing through lide 20 on the left and right sides respectively are outlet conduit 14 and inlet conduit 12. Bowl 16, as best seen in FIG. 3, includes a hollow center post 24 extending upwardly irom the bottom of the bowl above the top edge of a peripheral lip 18. Center post 24 has a shoulder 25 which supports screen element 44 in conjunction with shoulder 23 on bowl 16. Bowl 16 has a second sealable shoulder 22 which mates with the peripheral edge of closure lid 20, as seen in FIG. 2. Located in shoulder 22 is an O-ring groove 53 which contains an O-ring 50 and provides a pressure seal between bowl 18 and closure lid 20. Closure lid 20 is held in sealing relation with bowl 16 by the engagement of threaded shaft 26 with a threaded nut 30 molded into closure lid 20. Located around the top surface 34 of the center post 24 is a O-ring groove 35 for receipt of O-ring 52 which seals the interior of the trap from the bore in center post 24. Closure lid 20 is molded with a concentrically positioned hollow stem 32 which receives center post 24 in the assembled position, as seen in FIG. 2. The bottom surface of stem 32 engages the screen element 44 around center opening 46 as it is held against shoulder 25, as seen in FIGS. 2 and 3.

Closure lid 20 includes an outlet nipple 38 located on the left side thereof, and an inlet nipple 36 on the right side which extends substantially into bowl 16. Located around the periphery of closure lid 20 is circumferential rib 42 which adds structural strength to member 20. The lower end 37 of nipple 36 engages opening 48 in screen element 44 (see FIG. 3), thereby connecting the inlet conduit 12 to the lower chamber 58 in the trap, as seen in FIG. 2. Lower chamber 58 is separated from upper chamber 60 by screen element 44. Screen element 44 includes an integral support sleeve 45, as seen in FIGS. 2 and 3, which allows closure lid 20 to apply pressure to the outer periphery of the screen element. Molded on the end of threaded shaft 26 is a handle 28 which has a very substantial diameter to apply the necessary mechanical advantage for manually engaging and disengaging threaded nut 30. Handle 28 is also shaped with a flat bottom and functions as a base leg when the trap is not otherwise supported. Shaft 26 can be easily removed through the turning of handle 28 and the breaking of O-ring seals 50 and 52 between the bowl 16 and closure lid 20. Compression ring couplings 54, connected to the ends of inlet and outlet conduits 12 and 14 are conventional in the plumbing art for connection with drain lines.

Figure 4:
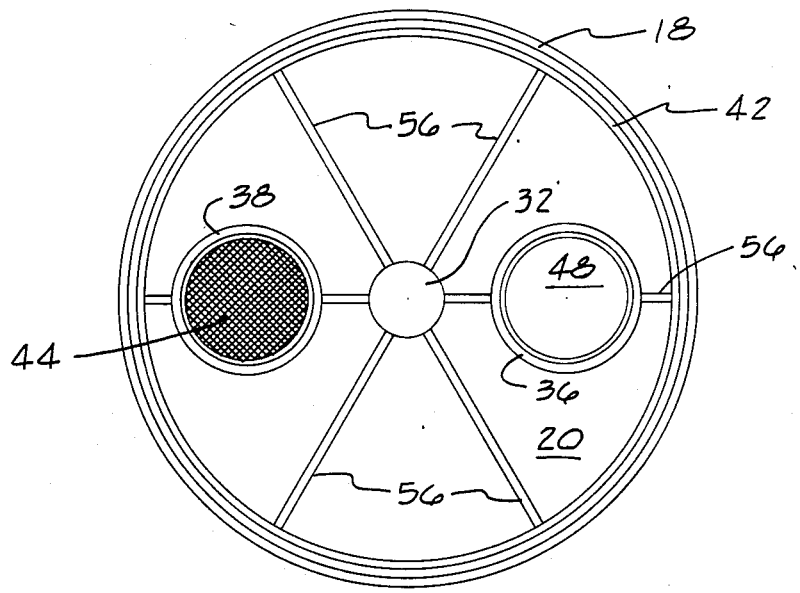
FIG. 4 is a top view of a modified version of the trap with the inlet and outlet conduits removed.

FIG. 4 is similar to the other figures with the exception of the addition of structural ribs 56, radially positioned aorund the closure lid 20. Looking at FIG. 4 the screen element 44 is seen through the outlet nipple 38 while the screen is not seen on the right side due to screen opening 48.

OPERATION

When the trap 10 is utilized in a conventional sink drain line, as seen in FIG. 2, the water level 62 will maintain itself at the high level in the outlet line 14, as illustrated. As water enters inlet line 12, it flows directly into the lower chamber 58 of the trap, splitting its flow in a rolling path as indicated by the arrows in FIG. 2, and then passes upward through screen element 44. Particulate material either settles out in the bottom of bowl 16 or is held by the undersurface of screen 44. Since screen 44 is an up-flow screen, any filtered particulate material would have a tendency to settle in the bottom of the bowl 16 rather than clog the screen element 44. Likewise the rolling action of fluid entering lower chamber 58 would have a tendency to wash the undersurface of screen element 41. The weir height H of the trap, as illustrated in FIG. 2, could be increased by raising outlet conduit 14.

When it is desirous to clean the trap 10, handle 28 is merely unscrewed and bowl 16 is pulled downwardly breaking O-ring seals 50 and 52. The standing water in inlet and outlet conduits 12 and 14 is contained within bowl 16 by the lip 18. Screen element 44 can be easily separated from the bowl 16 and the bowl can be readily cleaned. Bowl 16 can be left to stand on flat bottomed handle 28 or with the handle removed bowl 16 can rest on concentric flange 29.

Various other types of filtering elements, not illustrated in the drawings, could be used in place of the fine mesh screen 44, such as paper, sponge or foam filter elements which can be chemically treated for the removal of various vapors, metals or chemicals in solution. Also, in place of mesh screen 44 could be electrically charged plates utilized for recovery of silver or other metals. When used strictly as a gas trap, the screen 44 can be omitted.

The universal trap can be utilized in either a water drain system or in an air suction or air-water system such as that used in the field of dentistry. The trap can also be utilized in a positive pressure system.

Other applications of this universal trap may be considered by those skilled in the art upon reviewing the description of this preferred embodiment. The defined embodiments are meant for illustrative purposes only, and any changes or variations within the scope of the appended claims are intended to be secured by any claims acquired herein.

What is claimed as the invention is:

1. A universal drain trap and separator comprising:
   an arcuate-shaped bowl having an open top and a center post extending upwardly through the plane of the open top thereof;
   a lid member removably engageable with the top of the bowl and the center post in sealing relation;
   inlet conduit means attached to the lid and extending into the bowl for admission of fluids, solids and gases;
   outlet conduit means attached to the lid connecting the trap to drain;
   fastening means including a handle on the lower end thereof extending up through the center post for attachment to the lid; and
   a peripheral lid means extending above the top of the bowl extending upwardly sufficiently such that when the bowl is removed from the lid, substantially all the fluid normally standing in both of said conduit means and said trap will be contained in the bowl.

2. A universal drain trap and separator as set forth in claim 1, wherein the lid member includes a stem portion concentrically positioned for receipt of the center post in the assembled position.

3. A universal drain trap and separator as set forth in claim 1, wherein the lid member includes a concentrically positioned hollow stem extending upwardly from the lid and engaging means in the end thereof for receipt and engagement with the center post and the fastening means.

4. A universal drain trap and separator as set forth in claim 1, including a screen means positioned within the bowl defining upper and lower chambers therebetween, the inlet conduit extending through the screen into the lower chamber and the outlet conduit extending from the upper chamber to drain.

5. A universal drain trap and separator as set forth in claim 4, wherein the bowl is rounded in horizontal cross section with a curved bottom and the inlet conduit enters the bowl adjacent the side thereof so that inlet flow enters tangentially spreading across the bowl and then up the opposite side flowing across and through the screen means into the upper chamber.

6. A universal drain trap and separator as set forth in claim 1, including sealing means on the upper end of the center post and the lid member includes a stem portion concentrically positioned for receipt of the center post in sealing relation with said seal means.

7. A universal drain trap and separator as set forth in claim 1, wherein the fastening means is a threaded shaft which extends up through the center post for engagement with the lid member and the handle has a flat bottom base for otherwise supporting the trap.

8. A universal drain trap and separator as set forth in claim 1, wherein the bowl has a concentric flange means on the bottom thereof for free-standing support thereof.

9. A universal drain trap and separator as set forth in claim 1, including filtering means horizontally positioned within the bowl defining upper and lower chambers therebetween with the inlet conduit extending through the filter means into the lower chamber and outlet conduit extending from the upper chamber to drain.

10. A universal drain trap and separator as set forth in claim 1, wherein the horizontal cross sectional area of the bowl is approximately ten times the horizontal cross sectional area of the inlet or outlet conduit whereby a substantial amount of particulate material can be collected in the bowl without substantial obstruction to flow through the trap.

11. A universal drain trap and separator as set forth in claim 1, including a screen means positioned within the bowl defining upper and lower chambers therebetween, the inlet conduit extending through the screen means approximate one side of the bowl into the lower chamber while the outlet conduit extends from the upper chamber approximate the opposite side of the bowl to drain.

12. A universal drain trap and separator comprising:
   an arcuate-shaped bowl having an open top;
   a lid member removably engageable with the top of the bowl in sealing relation;
   inlet conduit means attached to the lid and extending into the bowl for admission of fluids, solids and gases;

outlet conduit means attached to the lid connecting the trap to drain;
fastening means for attachment of said bowl to the lid in sealing relation; and
a peripheral lip means attached to the bowl extending above said top sufficiently such that when the bowl is removed from the lid, substantially all the fluid normally standing in both of said conduit means and said trap will be contained in the bowl.

* * * * *

UNITED STATES PATENT OFFICE
CERTIFICATE OF CORRECTION

Patent No. 4,700,412                    Dated  October 20, 1987

Inventor(s)  John L. Manuel

It is certified that error appears in the above-identified patent and that said Letters Patent are hereby corrected as shown below:

Column 1, line 14, change "coniiguredp-trap" to - - configured P-trap - - .
Column 1, line 28, change "substantia" to - - substantial - - .
Column 1, line 38, change "iilters" to - - filters - - .

Column 2, line 16, change "irom" to - - from - - .
Column 2, line 24, change "18" to - - 16 - - .

Column 3, line 17, change "41" to - - 44 - - .
Claim 1, line 15, change "lid" to - - lip - - .

Signed and Sealed this

Seventeenth Day of May, 1988

*Attest:*

DONALD J. QUIGG

*Attesting Officer*            Commissioner of Patents and Trademarks